UNITED STATES PATENT OFFICE.

HARRY P. BASSETT, OF CYNTHIANA, KENTUCKY

ACID-PROOF REFRACTORY COMPOSITION.

1,390,327.     Specification of Letters Patent.     Patented Sept. 13, 1921.

No Drawing.     Application filed October 15, 1919. Serial No. 330,904.

*To all whom it may concern:*

Be it known that I, HARRY P. BASSETT, a citizen of the United States, residing at Cynthiana, in the county of Harrison and State of Kentucky, have invented certain new and useful Improvements in Acid-Proof Refractory Compositions, of which the following is a specification.

This invention relates to acid proof refractory compositions and particularly to acid proof refractory bricks, cements and plastic linings for furnaces and the like.

Numerous attempts have been made to provide compositions of this character which would be inexpensive to manufacture, capable of withstanding a high temperature and not subject to the disadvantage that when formed into bricks will become warped, or distorted when subjected to the process of burning or when put into use.

Now, I have discovered that by the use of sand, iron either in the metallic state or in the form of a compound, an alkali metal compound as, for example, sodium silicate or sodium borate, and a silicate binder such as Portland cement, infusorial earth or potters clay, I am able to produce acid proof refractory material suitable for lining furnaces and the like which contains a higher content of silica than prior compositions and able to withstand higher temperatures without injury therefrom and which, when formed into bricks, can be burned and used without warping, fusing out of shape or sustaining other like injury.

A satisfactory composition embodying my invention comprises the following materials in the following proportions by weight:

Sand _____ 100 to 120 parts
    Iron oxid _____ 5 parts
    Sodium silicate ___ 4 parts
    Portland cement __ 5 parts This material is suitable for being formed into bricks or for use as a wet or a dry cement in the usual manner, as will be understood by those skilled in this art. Where the material is to be used in the form of bricks, however, I may advantageously add 5 parts by weight of infusorial earth thereto. Where it is to be used as a wet or a dry cement, I prefer to use 10 parts by weight of potters' clay in addition to the Portland cement.

Where the material is formed into bricks, I prefer to add thereto before forming and burning, from about 25 to 35 per cent. by weight of crushed brick made from the same composition. The bricks are formed and burned in the usual way, the temperature at which they are burned being preferably from about 2000° F. to 3000° F.

An important advantage of my improved composition, particularly where it is used in the form of bricks, results from the use of a plurality of binders which are successively effective throughout different ranges of temperatures from ordinary atmospheric temperatures to 3000° F. or above to hold the composition in a "set" or substantially rigid form, whereby warping, distortion or analogous injury is prevented. For example, the Portland cement or potters' clay is effective as a binder to hold the composition firmly in shape from ordinary atmospheric temperatures to a red heat or above. The silicon in combination with the alkali metal present is effective as a binder from a red heat to 1800° F. or somewhat above and the compound of iron and silicon is effective as a binder to maintain the "set" of the composition from 1800° F. to 3000° F. and above; in fact, to the highest temperature to which furnace linings are subjected, such iron and silicon compound becoming progressively harder as the heat to which the material is subjected is raised above 1800° F.

Another important advantage of my improved composition is that by reason of the use of the materials employed with the sand, I am able to provide a satisfactory acid proof refractory composition containing a very small proportion of cementitious material, whereby my composition is more durable and and reliable in use and capable of being subjected to a higher temperature without fusion or disintegration.

I have found that instead of using iron or an iron compound, I may employ any metal of the iron or aluminum groups or compound thereof, notably aluminum, titanium, chromium, zirconium or tungsten or their compounds and metals comprised within the iron and aluminum groups are, therefore, to be considered as equivalents of iron for use in my improved composition.

While I have described in detail the preferred form of my composition, the preferred proportions of ingredients and the preferred method of production, it is to be understood that my invention is not strictly limited thereto except as set forth in the subjoined claims.

Having thus described my invention, I claim:

1. The herein described acid proof refractory composition comprising silica, and a plurality of binders effective to maintain the "set" of such composition successively throughout different ranges of temperature from ordinary atmospheric temperatures to 3000° F.

2. The herein described acid proof refractory composition comprising sand, a binding agent effective at temperatures from ordinary atmospheric temperatures to a red heat, a binding agent effective at temperatures from a red heat to 1800° F. and a binding agent effective at temperatures from 1800° F. to 3000° F.

3. The herein described acid proof refractory composition comprising silica, a metal comprised within the iron and aluminum groups, an alkali metal compound and a silicate binder.

4. The herein described acid proof refractory composition comprising sand, iron, an alkali metal compound and a silicate binder.

5. The herein described acid proof refractory composition comprising sand, iron, sodium silicate, and a silicate adapted to act as a binder for the composition at temperatures below a red heat.

6. The herein described acid proof refractory composition comprising silica, iron, sodium silicate, Portland cement, and infusorial earth.

7. The herein described acid proof refractory composition comprising approximately from 100 to 120 parts by weight of sand, about 5 parts by weight of iron oxid, about 4 parts by weight of sodium silicate, and about 5 parts by weight of Portland cement.

8. The herein described acid proof refractory composition comprising approximately from 100 to 120 parts by weight of sand, about 5 parts by weight of iron oxid, about 4 parts by weight of sodium silicate, about 5 parts by weight of Portland cement, and about 5 parts by weight of infusorial earth.

9. The herein described acid proof refractory brick comprising sand, a plurality of binders effective to maintain the "set" of such composition successively throughout different ranges of temperature, from ordinary atmospheric temperatures to 3000° F. and approximately from 25 to 35 per cent. by weight of crushed brick made from the same composition.

10. The herein described acid proof refractory composition comprising silica, iron, an alkali metal compound, a silicate binder, and approximately from 25 to 35 per cent. by weight of crushed brick made from the same composition.

In testimony whereof I affix my signature in presence of two witnesses.

HARRY P. BASSETT.

Witnesses:
MARY F. LYONS,
CURTIS C. MEIGS.